Figure 1:
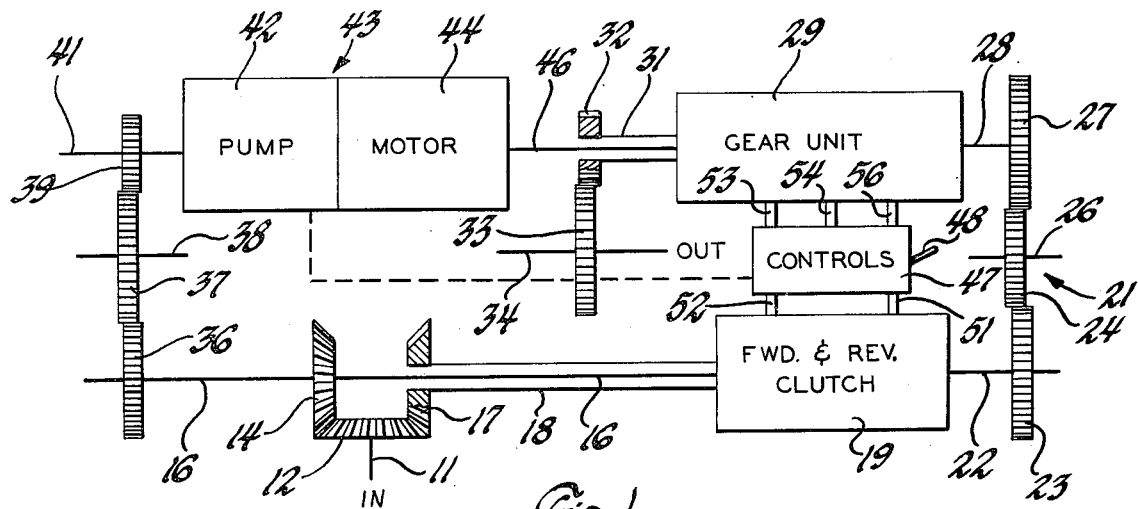

United States Patent [19]

Utter

[11] 3,915,274
[45] Oct. 28, 1975

[54] DOUBLE AREA PISTON CLUTCH
[75] Inventor: Robert C. Utter, Indianapolis, Ind.
[73] Assignee: General Motors Corporation, Detroit, Mich.
[22] Filed: Oct. 23, 1973
[21] Appl. No.: 408,465

[52] U.S. Cl. ............. 192/3.57; 74/745; 192/87.15; 192/109 F
[51] Int. Cl.² ........................................ B60K 21/00
[58] Field of Search .......... 192/109 F, 87.15, 87.16, 192/87.17, 3.57

[56] References Cited
UNITED STATES PATENTS

| | | | |
|---|---|---|---|
| 2,916,122 | 12/1959 | Hindmarch | 192/109 F |
| 3,245,507 | 4/1966 | Hilpert | 192/87.17 |
| 3,262,531 | 7/1966 | Black et al. | 192/109 F |
| 3,282,385 | 11/1966 | Snyder | 192/109 F |
| 3,352,392 | 11/1967 | Black et al. | 192/3.57 |
| 3,378,111 | 4/1968 | Greer et al. | 192/109 F |
| 3,422,350 | 10/1969 | Overson | 192/109 F |
| 3,470,988 | 10/1969 | Sieverkropp | 192/109 F |
| 3,596,535 | 8/1971 | Polak | 74/720.5 |
| 3,799,308 | 3/1974 | Erisman | 192/3.57 |

Primary Examiner—Benjamin W. Wyche
Attorney, Agent, or Firm—A. M. Heiter

[57] ABSTRACT

A transmission having a forward and reverse input clutch unit and a variable ratio drive unit having controls first selecting forward or reverse drive of a drive train portion and then selecting a ratio drive to connect the drive train portion to drive the transmission output. The forward and reverse clutches each have a fluid motor with a piston assembly having an inner piston and an outer piston respectively fitting in an inner annular chamber and outer annular chamber in a rotary housing. For engaging each clutch fluid under pressure is supplied by a radial passage extending past the inner chamber and connected to the outer chamber to supply fluid to the outer chamber to move the piston assembly to take up clutch clearance to apply the clutch with full pressure on a small area providing a low capacity sufficient to smoothly initiate and provide the drive capacity to drive the drive train portion under inertia load. During such movement of the piston assembly the unfilled volume of the inner chamber is increased and fluid is supplied from the outer chamber through a restricted passage to the inner chamber to pressurize the inner chamber a predetermined time period later to provide high capacity clutch engagement to drive the transmission under output load when a drive is engaged. On clutch disengagement, the exhaust of clutch apply pressure is exhausted, opening a one-way valve connecting the inner chamber to the outer chamber which is vented by a centrifugal ball dump valve.

8 Claims, 2 Drawing Figures

DOUBLE AREA PISTON CLUTCH

This invention was made in the course of work under contract or subcontract thereunder with the Department of Defense and relates to transmissions and particularly fluid actuated drive engaging devices.

SUMMARY OF INVENTION

The transmission has an input drive member selectively connected by a forward drive clutch or a reverse drive clutch to drive an intermediate drive train portion which is selectively connected by a multiratio range unit to the transmission output. The transmission controls first selectively engage the forward or reverse clutch and then selectively engage a ratio drive in the range unit. On initial engagement of the forward or reverse clutch there is a low inertia load required to accelerate the intermediate drive train portion to input speed and then on engagement of a range unit ratio drive there is a high load to initiate the ratio drive under output load. The forward and reverse clutches are located in a rotary housing having for each clutch a cylinder having an inner and outer annular chamber. A piston assembly for each cylinder has an inner annular piston fitting the inner chamber and an outer annular piston fitting the outer chamber for reciprocation between a disengaged position and an engaged position. The fluid pressure apply line for each cylinder extends radially past the inner chamber to the outer chamber. A restricted passage connects the outer chamber to the inner chamber and extends through the outer piston. A one-way check valve connects the inner chamber for flow to the radial apply passage when it is exhausted. A centrifugal ball check valve exhausts the outer chamber when the radial apply passage is exhausted.

On the supply of fluid from the control valve under regulated line pressure to apply a clutch, the fluid flows through the radial passage to the outer chamber and closes the one-way valve. The fluid pressure in the outer chamber increases as required to move the piston against the retraction spring providing engagement movement to engage the clutch with the regulated line pressure and centrifugal pressure head acting on the small area of the outer piston to provide a low engaging force for a low capacity engagement meeting the low torque and power requirements to smoothly initiate drive of the intermediate power train portion merely under inertia load. During such engagement fluid under the pressure head in the outer chamber flows through the restricted passage to the inner chamber at a controlled rate and the inner chamber expands at a controlled rate due to engagement movement to provide a controlled time delay period for filling the inner chamber with line pressure and less centrifugal pressure head acting on a larger area to increase the engagement capacity to the high torque capacity to meet full requirements for transmission drive when later engaged for drive under output load. When the clutch is engaged, flow to the chambers ceases and both chambers and the radial passage are filled under line and centrifugal pressure head providing equal pressure on opposite sides of the one-way valve so centrifugal force opens the one-way valve. The clutch is released by exhausting the radial passage at the control valve so fluid pressure in the inner chamber flows through the open one-way valve and the radial passage to the outer chamber which is exhausted through the open centrifugal ball dump valve for quick clutch release.

These and other features of the invention will be more apparent from the following description and drawing.

FIG. 1 diagrammatically shows the transmission gear train.

Figure 2:
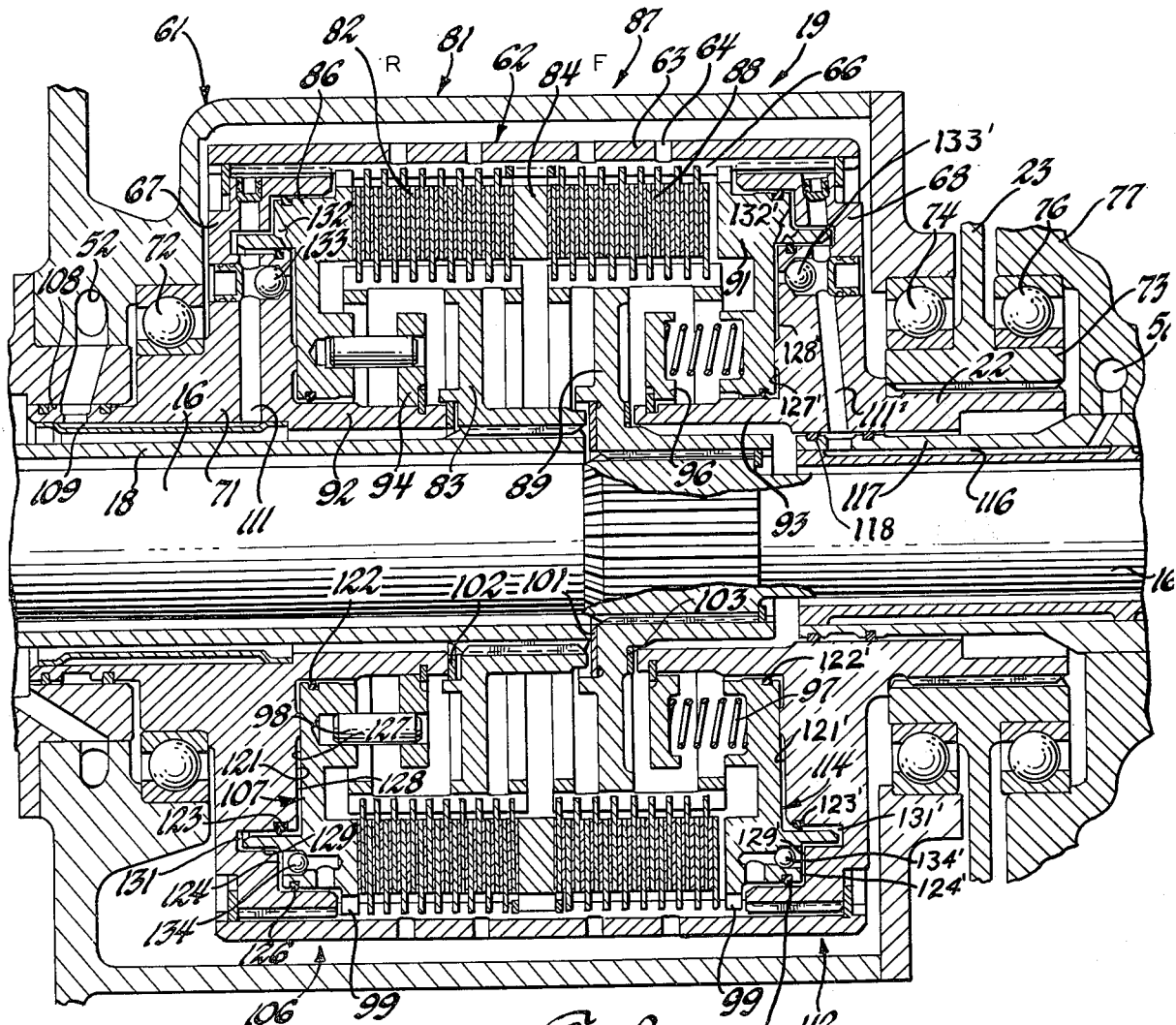

FIG. 2 shows the forward and reverse clutch unit.

The invention is illustrated by the preferred embodiment of the transmission shown in FIG. 1. The input shaft 11 drives input bevel gear 12 which meshes with and drives forward bevel gear 14 driving forward input shaft 16 and reverse bevel gear 17 drives reverse input shaft 18. The forward and reverse shafts 16 and 18 are selectively connected by the forward and reverse clutch unit 19 to drive the intermediate connecting gearing drive portion 21. This connecting gearing portion has a forward and reverse clutch unit output shaft 22 driving gear 23 which is connected by pinion gear 24 rotating on shaft 26 mounted on the housing to drive gear unit input gear 27 and shaft 28 and the continuously driven input member or members of the gear unit 29. The gear unit 29 has an output shaft 31 driving spur gears 32 and 33 and final output or load shaft 34. The forward input shaft 16 also drives, through gear 36, pinion gear 37 rotatably mounted on shaft 38, pump input gear 39 and shaft 41, the pump 42 of hydrostatic transmission 43. In the hydrostatic transmission 43. The variable displacement pump 42 drives the motor 44 which has an output shaft 46 providing a second input to the gear unit 29. The final output shaft 34 may be directly connected to a load or connected by a hydrostatic transmission controlled gear drive for a tracked vehicle steering. Basically the transmission drive train has an input shaft or member 11 first manually selectively connected by a forward and reverse clutch unit 19 to drive intermediate connecting gearing drive 21, having considerable inertia, which provides the input to a range gear unit 29 which is then operative to or in conjunction with hydrostatic transmission 43 to provide a selected ratio or vehicle ratio drive to the final output. This considerable inertia provides considerable inertia load but is a low torque load as compared to the high torque load at the full driven load. Such a transmission drive train is shown in U.S. Pat. Nos. 3,596,535 James C. Polak, patented Aug. 3, 1971, 3,590,658 Robert M. Tuck, patented July 6, 1971 and 3,426,621 J. J. Mooney Jr. and Marion D. Smith, patented Feb. 11, 1969, all incorporated by reference. The controls 47 have a forward, neutral and reverse selector lever 48 and other manual or automatic controls operative to first selectively supply the regulated control fluid pressure to the forward clutch apply line 51 or the reverse clutch apply line 52 and exhaust the other clutch apply line and then after a predetermined time delay establish a first ratio drive in the gear unit 29 by supplying fluid pressure to the first ratio apply line 53. Ratio changes may be made by subsequently supplying additional supply lines 54 and 56 or selectively supplying other supply lines 54 and 56 and exhausting the other supply lines. A suitable control for controlling such transmissions in this manner is shown in U.S. Pat. No. 3,592,281, Robert C. Utter and Howard W. Christenson patented July 13, 1971 incorporated by reference.

The forward and reverse clutch unit 19 has a stationary housing 61 and a rotating output drum housing assembly 62 mounted therein. The drum assembly 62 has a cylindrical portion 63 having openings 64 for cooling fluid flow and internal splines 66. An end wall 67 is secured within cylindrical portion 63 at the reverse clutch end, by conventional splines and axially positioned by a conventional shoulder and snap ring. At the other or forward clutch end, an end wall 68 is similarly secured in cylindrical portion 63. To rotatably support and axially locate the drum assembly 62, the end wall 67 has an outward extension 71 and bearing 72 between the extension and housing 61. Also the other end wall 68 has an outboard extension or output sleeve shaft portion 22 spline connected to the hub 73 of output gear 23. Bearings 74 and 76 between gear hub 73 and housing 61 and another stationary housing portion 77 rotatably support gear 23 and drum assembly 62. The reverse clutch 81 has a clutch plate pack 82 having intermediate plates splined to splines 66 on cylinder 63 and alternate plates splined to the outer diameter of hub 83 which is splined at its inner diameter to reverse input shaft 18. The reverse clutch plate pack 82 is located axially between the central backing plate 84 and reverse piston 86. The backing plate 84 is splined to splines 66 and axially fixed by snap rings to rotatably and axially secure the backing plate to cylinder 63.

The forward clutch 87 has a clutch pack 88 having intermediate plates splined to splines 66 on cylinder 63 and alternate plates splined to the outer diameter of hub 89 which is splined at its inner diameter to forward input shaft 16. The forward clutch pack 88 is axially located between fixed backing plate 84 and forward piston 91. The end walls 67 and 68 have respectively at their inner diameter inwardly extending cylindrical extensions 92 and 93 supporting the reaction spring abutments 94 and 96. Between each piston and its reaction spring abutment there are a plurality of reaction springs 97 to return the pistons and guide pins 98 to prevent relative rotation between the piston and its reaction plate. Each piston at the outer diameter has splines 99 engaging splines 66 to prevent relative rotation between the pistons and drum assembly. Axial thrust bearing 101 is located between hubs 83 and 89, thrust bearing 102 is between hub 83 and wall extension 92 and thrust bearing 103 is between hub 89 and wall extension 93 to axially locate the hubs. The forward and reverse input shafts 16 and 18 are rotatably supported by bearings, not shown, on other portions of the housing.

The reverse clutch is actuated by a reverse clutch fluid actuator motor 106 having a dual cylinder 107 in end wall 67 for dual piston 86. The reverse apply line 52 in stationary housing 61 is connected by a transfer bushing 108 to axial passage portion 109 to radial passage portion 111 in wall 67 of rotating output drum housing assembly 62. The forward clutch is actuated by a forward clutch fluid actuator motor 112 having a dual cylinder 114 in end wall 68 for dual piston 91. The forward apply line 51 is connected through stationary housing portion 77 and by passage portion 116 in a sleeve housing portion 117 to transfer bushing 118 to passage 111'.

Since the reverse and forward dual pistons 86 and 91 and dual cylinders 107 and 114 and the passages and valves for supply and exhaust are the same, these features are described with reference numerals to the reverse fluid motor 106 but the same description with reference numerals primed applies to the forward fluid motor 112. The reverse dual cylinder 107 has an inner annular cylinder 121 between seals 122 and 123 and an outer annular cylinder 124 between seals 123 and 126. The dual piston 86 has an inner annular piston 127 cooperating with inner cylinder 121 and its seals to form an inner annular chamber 128 and an outer annular piston 129 cooperating with outer cylinder 124 and its seals to form an outer annular chamber 131. The reverse clutch apply passage 52 has a radial portion 111 extending to outer chamber 131. A restricted passage 132 extends diagonally through outer piston 129 to connect the outer chamber 131 to inner chamber 128. A one-way ball valve 133 in response to pressure in passage 111 greater than in inner chamber 128 closes to prevent flow from passage 111 to the inner chamber 128. When the pressure in inner chamber 128 is greater than the pressure in passage 111 respectively by unbalanced pressure and centrifugal force the ball valve opens to permit exhaust flow from the inner chamber 128 to passage 111. The centrifugal ball dump valve 134 is closed by apply pressure in outer chamber 131 and opens for dump exhaust in response to centrifugal force due to the rotation of drum assembly 52 when line 111 is exhausted at the control valve.

OPERATION

When the engine is running and driving input shaft 11, both the forward input shaft 16 and the reverse input shaft 18 are driven at engine operating speed. The transmission controls 47 in response to manual selection of forward or reverse drive operate to first engage the forward or reverse clutch which will accelerate the intermediate connecting gearing 21 under its inertia load from zero speed on a shift from neutral to forward or reverse or an opposite speed on a shift between forward and reverse to the same speed as the forward or reverse input shafts. So that this is a smooth shockless initial engagement, the initial clutch engaging capacity is matched to the capacity requirements for the inertia load required to accelerate the intermediate gearing from its prior speed to operating the speed of the selected drive.

Thus when the controls 47 initiate the supply of either forward or reverse clutch pressure in lines 51 or 52 the fluid pressure supply initially provides low capacity engagement as described with reference to the reverse clutch. The supply or apply pressure in line 111 closes one-way valve 133 so all fluid flows to the outer chamber 129 providing therein supply line pressure plus the high centrifugal pressure head in the small area outer chamber to provide engagement movement for a low capacity clutch engagement against the retraction springs matching the capacity requirements for initiating drive of the intermediate gearing under only inertia load. During this low torque and power capacity engagement, the engagement movement of the dual piston increases the volume of the inner chamber 128 and the restricted connection provides in timed relation to the pressure rise and pressure in the outer chamber a restricted feed to the expanding inner chamber. Thus the pressure rise in the outer chamber controls the initial low capacity engagement and controls the time delay of the full load high capacity feed to the larger area inner chamber to provide supply pressure plus a lower centrifugal pressure head to increase capacity for full output load torque and power capacity engagement in timed relation with the engagement of the ratio drive in the range unit by the controls. It is preferred that the forward reverse clutches be engaged for full capacity drive ahead of such engagement of the range unit fluid operated friction drive devices. Also, that the forward or reverse clutches be low capacity engaged before the range unit or transmission drive is partially engaged.

When a clutch such as reverse clutch 81 is to be disengaged, apply line 52 is exhausted at the controls 47 to reduce pressure in apply line portion 111. The line 111 and chambers 124 and 128 will remain filled with fluid under the centrifugal pressure head which varies from zero at or near the axis of rotation and increase with the square of the radius. The total pressure, due to the supply pressure component and the centrifugal pressure component, having equalized during clutch engagement in radial passage 111 and inner chamber 128 on opposite sides of the axially extending one-way valve 133 permitted centrifugal force to open one-way valve 133. Thus when line 52 is exhausted, the reduction of supply pressure on ball dump valve 134 permits centrifugal force to open the ball dump valve 134 and fluid in the inner chamber to immediately exhaust under the centrifugal pressure through the opened one-way valve 133 and radial passage 111 to the outer chamber and the outer chamber to exhaust through the ball dump valve for quick exhaust and release of the clutch. Thus when supply pressure line 52 is exhausted removing supply pressure, the inner chamber is first quickly emptied and then the outer chamber to quickly reduce the centrifugal pressure.

It will be appreciated that the above preferred embodiment may be modified.

It is claimed:

1. In a transmission; a fixed housing; an input member and an output member rotatably mounted on said fixed housing; a clutch drum housing rotatably mounted on said fixed housing and drive connected to one member; clutch plates alternately connected to said clutch drum housing and other member engageable to establish a drive with said clutch drum housing rotating with said members; fluid motor means having cylinder means formed in said clutch drum housing having a radial inner annular chamber and a radial outer annular chamber and unitary piston means rotating with said clutch drum housing having a radial inner annular piston fitting said inner chamber and a radial outer annular piston fitting said outer chamber; fluid pressure supply means for supplying fluid under a supply pressure to and exhausting said chambers to engage and disengage said clutch plates to establish and disestablish a drive having a supply passage extending from a radial inner portion of said clutch drum housing radially outward in said clutch drum housing adjacent said inner chamber and connected to said outer chamber to provide supply pressure in and filling said outer chamber providing supply pressure plus high centrifugal pressure for an initial low capacity drive engagement; a restricted passage connecting said outer chamber to said inner chamber to supply fluid pressure from said outer chamber to said inner chamber in delayed timed relation to the pressure in said outer chamber to provide after a time delay supply pressure filling said inner chamber and low centrifugal pressure to provide an additional force providing a high capacity drive engagement, a one-way valved passage means connecting said inner chamber to said outer chamber for flow only from said inner chamber to said outer chamber and operatively connected to said supply passage and inner chamber for maintaining said one-way valved passage means closed in response to supply pressure being supplied to said outer chamber and substantially until supply pressure is provided in said inner chamber and maintaining said one-way valved passage means open during the full time period of exhaust of said supply pressure and centrifugal ball dump valve means opening to connect said outer chamber for flow to exhaust in response to centrifugal force when said supply pressure is exhausted to first empty the inner chamber to reduce capacity and closing to block flow in response to supply pressure.

2. The invention defined in claim 1 and said one-way valved passage means opening in response to substantial equalization of supply pressure in said inner chamber and outer chamber and fluid flowing from said inner chamber through the previously opened one-way valved passage means to said outer chamber when said ball dump valve means connects said outer chamber to exhaust when said supply pressure is exhausted.

3. The invention defined in claim 1 and said one-way valved passage means opening on completion of said high capacity drive engagement and said ball dump valve on opening first emptying said inner chamber through said open one-way valved passage means for quick centrifugal pressure and capacity reduction.

4. The invention defined in claim 1 and said one-way valved passage means opening on supply pressure filling said outer chamber and inner chamber providing equalization of supply pressure head in said inner chamber and outer chamber plus a centrifugal pressure head having centrifugal valve means operative in response to equal valves of the supply pressure head plus centrifugal pressure head acting on the centrifugal valve means to open the one-way valved passage in response to centrifugal force during rotation of the fluid motor means to open the one-way valved passage means from the inner chamber to the outer chamber on high capacity drive engagement so when said supply pressure is exhausted to open said centrifugal ball dump valve means said inner chamber is connected through said one-way passage means to said outer chamber for immediate full exhaust flow from the inner chamber to the outer chamber and from the outer chamber to exhaust.

5. In a transmission; an input member; an intermediate connecting drive providing a low torque load due to its inertia; fluid operated clutch means connecting said input member to drive said connecting drive; an output load member having a high torque output load; variable ratio drive means having fluid operated drive means for establishing a drive and driven by said connecting drive and driving said output load member; said clutch means having input means driven by said input member and output means driving said connecting drive, clutch plates connected to said input means and output means; fluid motor means rotating during clutch engagement and having cylinder means formed in one of said input and output means having a radial inner annular chamber and a radial outer annular chamber and unitary piston means having a radial inner annular piston portion fitting said inner chamber and a radial outer annular piston portion fitting said outer chamber; control system means including fluid pressure supply means for supplying fluid under a supply pressure, a clutch apply line, and drive control means operative on a shift through neutral to drive to first supply fluid pressure to said clutch apply line and then to supply fluid pressure to said fluid operated drive means to establish a drive a predetermined time period after engagement of said clutch means; said clutch apply line having a portion extending in said one of said members to said outer chamber to provide said supply pressure plus high centrifugal pressure in said outer chamber to provide an initial low capacity engagement matching the capacity requirements for accelerating said intermediate connecting drive under said low torque inertia load to idle speed drive; a restricted passage connecting said outer chamber to said inner chamber to supply fluid pressure from said outer chamber to said inner chamber in timed relation to the pressure in said outer chamber to provide after a predetermined time period permitting engagement of said low capacity drive, the supply pressure plus a low centrifugal pressure providing a force providing high capacity engagement matching the capacity requirements to drive said high torque output load through said drive of said variable ratio drive means.

6. The invention defined in claim 5 and a one-way valved passage connecting said inner chamber to said outer chamber for flow only from said inner chamber to said outer chamber and operatively connected to said supply passage for closing said one-way passage in response to supply pressure in said outer chamber and less than supply pressure in said inner chamber and said one-way valved passage being open for flow from said inner chamber to said outer chamber when said supply pressure is exhausted, a ball dump valve connecting said outer chamber to exhaust when said supply pressure is exhausted and blocking flow in response to supply pressure supplied to said outer chamber.

7. The invention defined in claim 5 and a one-way valved passage connecting said inner chamber to said outer chamber for flow only from said inner chamber to said outer chamber and operatively connected to said supply passage for closing said one-way passage in response to supply pressure in said outer chamber and less than supply pressure in said inner chamber and said one-way valved passage on equalization of pressure in said inner chamber and said outer chamber opening for permitting flow from said inner chamber to said outer chamber, a ball dump valve connecting said outer chamber to exhaust when said supply pressure is exhausted and causing exhaust flow from said inner chamber through the previously open one-way valved passage to said outer chamber and blocking flow in response to supply pressure supplied to said outer chamber.

8. In a transmission; an input member; an intermediate connecting drive providing a low torque load due to its inertia; fluid operated clutch means connecting said input member to drive said connecting drive; an output load member having a high torque output load; variable ratio drive means having fluid operated drive means for establishing a drive and driven by said connecting drive and driving said output load member; said clutch means having input means driven by said input member and output means driving said connecting drive, clutch plates connected to said input means and output means; fluid motor means rotating during clutch engagement and having cylinder means formed in one of said input and output means having a first chamber and a second chamber and unitary piston means having a first piston portion fitting said first chamber and a second piston portion fitting said second chamber; control system means including fluid pressure supply means for supplying fluid under a supply pressure, a clutch apply line, and drive control means operative on a shift through neutral to drive to first supply fluid pressure to said clutch apply line and then to supply fluid pressure to said fluid operated drive means to establish a drive a predetermined time period after engagement of said clutch means; said clutch apply line extending to said first chamber to provide said supply pressure plus centrifugal pressure in said first chamber to operate said fluid motor means for providing an initial low capacity engagement matching the inertia drive low capacity requirements for accelerating said intermediate connecting drive under said low torque inertia load to provide an idle speed low capacity drive while said variable ratio drive means is in neutral; restricted passage means connecting said clutch apply line to said second chamber to supply fluid pressure to said second chamber in timed relation to the pressure in said first chamber to operate said fluid motor means, after a predetermined time period permitting engagement of said low capacity drive, for providing the supply pressure plus a centrifugal pressure providing a force providing high capacity engagement matching the capacity requirements to drive said high torque output load through said drive of said variable ratio drive means.

* * * * *

UNITED STATES PATENT AND TRADEMARK OFFICE
CERTIFICATE OF CORRECTION

PATENT NO. : 3,915,274
DATED : October 28, 1975
INVENTOR(S) : Robert C. Utter

It is certified that error appears in the above-identified patent and that said Letters Patent are hereby corrected as shown below:

Column 4, line 12, after "111" delete "respectively by unbal-" and insert therefor -- and when the pressures are equal and housing assembly 62 is rotating --;

Column 4, line 13, delete "anced pressure and centrifugal force"

Column 4, line 14, after "opens" insert -- respectively by unbalanced pressure and centrifugal force --.

Column 6, line 27, change "valves" to -- values --.

Signed and Sealed this

Seventh Day of September 1976

[SEAL]

Attest:

RUTH C. MASON
Attesting Officer

C. MARSHALL DANN
Commissioner of Patents and Trademarks